(12) United States Patent
Jeong et al.

(10) Patent No.: US 10,793,120 B2
(45) Date of Patent: Oct. 6, 2020

(54) CONTROL METHOD TO AVOID COLLISION AND VEHICLE USING THE SAME

(71) Applicants: HYUNDAI MOTOR COMPANY, Seoul (KR); KIA MOTORS CORPORATION, Seoul (KR)

(72) Inventors: Wooyeol Jeong, Seoul (KR); Jungwan Park, Seoul (KR); Chiyoung An, Cheongju-si (KR); Donghyuk Kim, Hwaesong-si (KR); Youngil Na, Hwaesong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 282 days.

(21) Appl. No.: 15/900,671

(22) Filed: Feb. 20, 2018

(65) Prior Publication Data

US 2019/0135246 A1 May 9, 2019

(30) Foreign Application Priority Data

Nov. 6, 2017 (KR) .......................... 10-2017-0146451

(51) Int. Cl.
| | |
|---|---|
| G06F 7/70 | (2006.01) |
| B60T 7/22 | (2006.01) |
| G08G 1/16 | (2006.01) |
| B60T 8/172 | (2006.01) |
| B60T 8/171 | (2006.01) |

(52) U.S. Cl.
CPC ................ *B60T 7/22* (2013.01); *B60T 8/171* (2013.01); *B60T 8/172* (2013.01); *G08G 1/166* (2013.01); *B60T 2201/022* (2013.01); *B60T 2210/32* (2013.01)

(58) Field of Classification Search
CPC ............. B60T 7/22; B60T 8/171; B60T 8/172
See application file for complete search history.

(56) References Cited

U.S. PATENT DOCUMENTS

| | | | |
|---|---|---|---|
| 7,734,416 B2 | 6/2010 | Yano et al. | |
| 7,844,384 B2 | 11/2010 | Seto | |
| 2017/0021835 A1* | 1/2017 | Kojima | .................... G07C 5/02 |
| 2017/0248950 A1* | 8/2017 | Moran | .................... G08G 1/165 |

FOREIGN PATENT DOCUMENTS

| | | |
|---|---|---|
| JP | 2006-7869 A | 1/2006 |
| JP | 2016-175521 A | 10/2016 |
| KR | 10-1999-026979 A | 4/1999 |
| KR | 10-0215277 B1 | 8/1999 |
| KR | 10-0249479 B1 | 5/2000 |
| KR | 10-2009-0039501 A | 4/2009 |
| KR | 10-1158564 B1 | 6/2012 |

(Continued)

*Primary Examiner* — Adam M Alharbi
(74) *Attorney, Agent, or Firm* — Brinks Gilson & Lione

(57) ABSTRACT

Disclosed herein are a vehicle and a control method thereof. The vehicle includes an obstacle detector for detecting an obstacle around the vehicle, and a controller configured to predict a chance of a collision with the obstacle on the side of a door if the obstacle detector detects the obstacle in front, and to perform partial braking control on the vehicle if the collision on the side of the door is predicted.

18 Claims, 11 Drawing Sheets

(56) References Cited

FOREIGN PATENT DOCUMENTS

| KR | 10-2014-0033274 A | 3/2014 |
| KR | 10-1389963 B1 | 4/2014 |
| KR | 10-1428216 B1 | 8/2014 |
| KR | 10-2016-0059350 A | 5/2016 |
| KR | 10-1717080 B1 | 3/2017 |

* cited by examiner

CONTROL METHOD TO AVOID COLLISION AND VEHICLE USING THE SAME

CROSS-REFERENCE TO RELATED APPLICATION

This application is based on and claims priority under 35 U.S.C. § 119 to Korean Patent Application No. 10-2017-0146451 filed on Nov. 6, 2017, in the Korean Intellectual Property Office, the disclosure of which is incorporated herein by reference in its entirety.

BACKGROUND

Field

Apparatuses and methods consistent with embodiments relate to a vehicle and a control method thereof.

Discussion of Related Art

A Forward Collision-Avoidance Assist (FCA) is a device to avoid a collision or minimize damage from the collision by recognizing an obstacle with an obstacle detector, such as a radar sensor or a camera and automatically activating the brake if a collision is predicted.

When FCA performs indiscriminate braking control when an obstacle is recognized, a vehicle having the door only one side makes it difficult for passengers to get out of the vehicle when the vehicle gets into a car accident and the door is broken.

The disclosure of this section is to provide background of the invention. Applicant notes that this section may contain information available before this application. However, by providing this section, Applicant does not admit that any information contained in this section constitutes prior art.

SUMMARY

An aspect of the present invention provides a vehicle and a method of controlling the vehicle for predicting a collision of the vehicle and securing space for escape via a door of the vehicle.

BRIEF DESCRIPTION OF THE DRAWINGS

The above and other objects, features and advantages of the present invention will become more apparent to those of ordinary skill in the art by describing in detail embodiments thereof with reference to the accompanying drawings, in which.

DETAILED DESCRIPTION OF EMBODIMENTS

Figure 1:
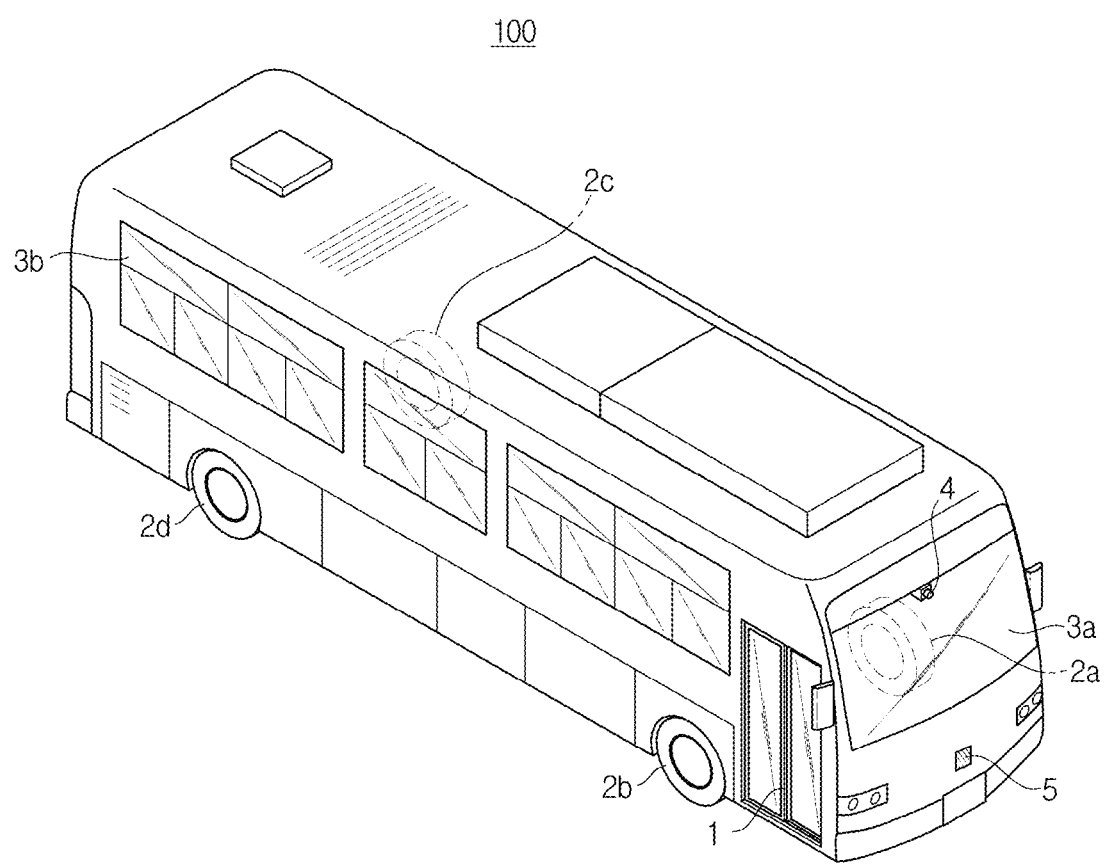
FIG. 1 shows the exterior of a vehicle, according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

According to an aspect of the invention a vehicle in includes an obstacle detector for detecting an obstacle around the vehicle, and a controller configured to predict a chance of a collision with an obstacle on the side of a door if the obstacle detector detects the obstacle in front, and to perform partial braking control on the vehicle if the collision on the side of the door is predicted.

The controller is configured to calculate a required braking distance or time to collision (TCC) to the obstacle based on the detection result of the obstacle detector and to predict a chance of a collision on the side of the door based on the calculation result.

The vehicle may further include a braking system for stopping movement of at least one of a plurality of car wheels, and the controller may be configured to control the braking system to brake one of the plurality of car wheels other than a car wheel on the side of a door if a collision on the side of the door is predicted.

The braking system may brake at least one of two front wheels, and the controller may be configured to control the braking system to brake one of the two front wheels other than a front wheel on the side of a door if a collision on the side of the door is predicted.

The controller may be configured to predict a collision on the side of the door based on information about a lateral position and width of the obstacle.

The controller may be configured to predict a chance of a collision on the side of the door based on overlap information including at least one of an overlapped ratio between the vehicle and the obstacle in the width direction, non-overlapped ratios between the vehicle and the obstacle in the width direction on the left and right sides, and a lateral position where the center of the width of the obstacle contacts the vehicle in the width direction.

The controller may be configured to determine that there is a collision on the side of a door if an overlapped ratio between the vehicle and the obstacle in the width direction exceeds a first threshold percent (%) and a non-overlapped ratio between the vehicle and the obstacle on the side of a door in the width direction is about 0% in a case that the width of the obstacle is equal to or greater than a threshold.

The controller may be configured to determine that there is a collision on the side of a door if an overlapped ratio between the vehicle and the obstacle in the width direction exceeds a second threshold percent (%) and the center of the width of the obstacle contacts a point that exceeds about 60% of the width of the vehicle in a case that the width of the obstacle is less than a threshold.

The controller may be configured to calculate the required braking distance in the following equation:

$$D_{required} = \frac{V_{current}^2}{2a_{fullbrake}},$$

where $D_{required}$ denotes a required braking distance, $V_{current}$ denotes a current relative speed between the vehicle and the obstacle, and $a_{full\ brake}$ denotes a relative accelerated velocity in full braking≈decelerated velocity in full braking+relative accelerated velocity.

The vehicle may further include a braking system for stopping movement of a plurality of car wheels, and the controller may be configured to calculate a required braking distance or time to collision (TCC) to the obstacle based on the detection result of the obstacle detector, to predict a chance of a collision with the obstacle based on the calculation result, and to control the braking system to stop movement of the plurality of car wheels if it is determined that it is possible to avoid a collision with the obstacle.

The vehicle may further include a braking system for stopping movement of a plurality of car wheels, and the controller may be configured to calculate a required braking distance or time to collision (TCC) to the obstacle based on the detection result of the obstacle detector, predict a chance of a collision with the obstacle based on the calculation result, to control the braking system to stop movement of the plurality of car wheels if it is determined that it is impossible to avoid a collision with the obstacle, to predict a chance of a collision with the obstacle on the side of a door, and to control partial braking over the vehicle if the collision on the side of the door is predicted.

The vehicle may further include a door.

According to an aspect of another embodiment, there is provided a control method of a vehicle. The method includes detecting an obstacle around the vehicle, predicting a chance of a collision with the obstacle on the side of a door, and performing partial braking control on the vehicle if the collision on the side of the door is predicted.

The predicting of a chance of a collision with the obstacle on the side of a door may include calculating a required braking distance or time to collision (TCC) to the obstacle based on the detection result and predicting a chance of a collision on the side of the door based on the calculation result.

The performing of partial braking control on the vehicle may include controlling a braking system to brake at least one of a plurality of car wheels other than a car wheel on the side of a door.

The performing of partial braking control on the vehicle may include controlling the braking system to brake one of two front wheels other than the other front wheel on the side of a door if a collision on the side of the door is predicted.

The predicting of a chance of a collision with the obstacle on the side of a door may include predicting a chance of a collision on the side of the door based on information about a lateral position and width of the obstacle.

The predicting of a chance of a collision with the obstacle on the side of a door may include predicting a chance of a collision on the side of the door based on overlap information including at least one of an overlapped ratio between the vehicle and the obstacle in the width direction, non-overlapped ratios between the vehicle and the obstacle in the width direction on the left and right sides, and a lateral position where the center of the width of the obstacle contacts the vehicle in the width direction.

The predicting of a chance of a collision with the obstacle on the side of a door may include determining that there is a collision on the side of a door if an overlapped ratio between the vehicle and the obstacle in the width direction exceeds a first threshold percent (%) and a non-overlapped ratio between the vehicle and the obstacle on the side of a door in the width direction is about 0% in a case that the width of the obstacle is equal to or greater than a threshold.

The predicting of a chance of a collision with the obstacle on the side of a door may include determining that there is a collision on the side of a door if an overlapped ratio between the vehicle and the obstacle in the width direction exceeds a second threshold percent (%) and the center of the width of the obstacle contacts a point that exceeds about 60% of the width of the vehicle in a case that the width of the obstacle is less than a threshold.

Additionally, embodiments will now be described more fully hereinafter with reference to the accompanying drawings. Embodiments of the invention may, however, be embodied in many different forms and should not be construed as being limited to the embodiments set forth herein. These embodiments are provided so that this disclosure will be thorough and complete and will fully convey the embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the embodiments of the present disclosure, examples of which are illustrated in the accompanying drawings, wherein like reference numerals refer to like elements throughout.

An aspect of the invention provides a system and method for controlling operation of a plurality of brakes in a vehicle. In embodiments, in a braking operation, the vehicle is controlled to make a turn for avoiding collision at a door-located side.

Figure 3A:
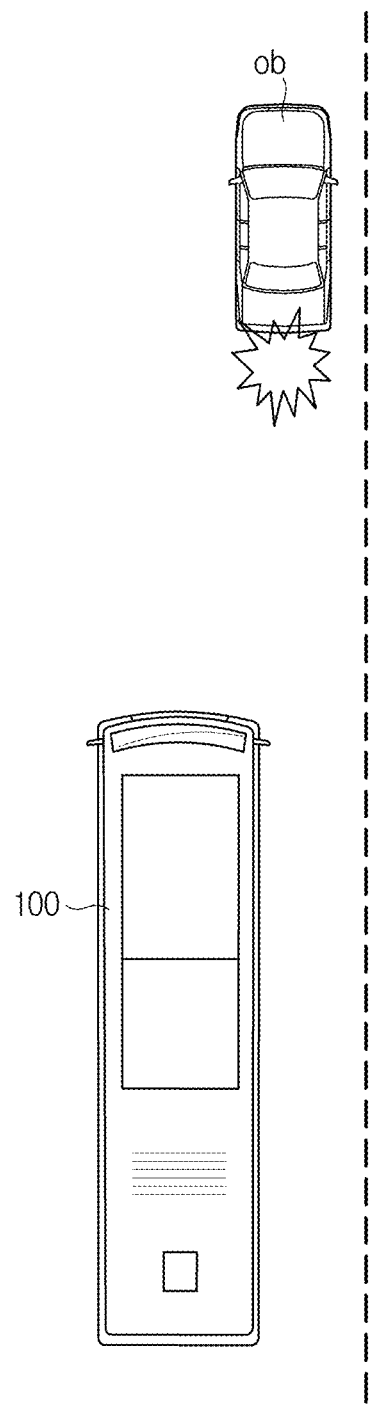
FIGS. 3A to 3E show a detailed operation procedure of the safety controller and the braking controller of the vehicle in a case that there is a collision between the vehicle and an obstacle.

In embodiments, a controller installed in the vehicle monitors surroundings of the vehicle 100 and compute a risk of collision with another vehicle ahead (ob in FIG. 3A). When it is determined that the risk is greater than a predetermined reference (or a collision is expected when no braking action is taken from the current speed), the controller activates each of the plurality brakes to slow down the vehicle (first stage of braking). In embodiments, the controller controls operation of the brakes such that the vehicle 100 maintains its current driving direction and/or remain inside the current lane while the vehicle is slowing down during the first stage of braking.

Figure 2:
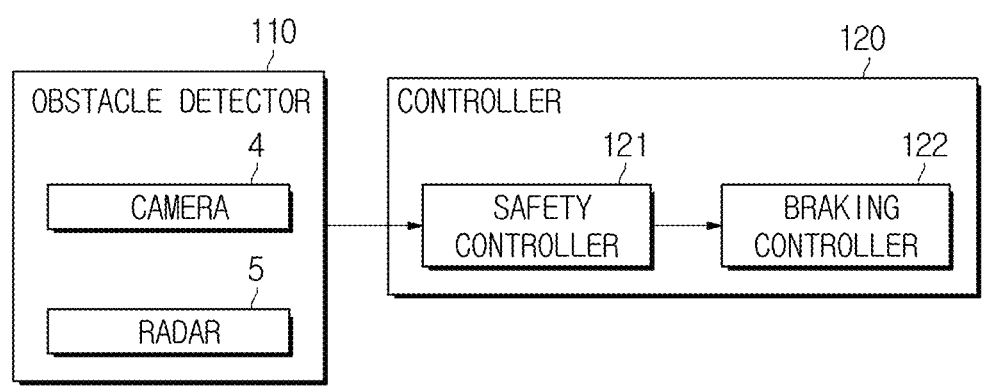
FIG. 2 is a control block diagram of a vehicle, according to an embodiment of the present disclosure.

In embodiments, the controller computes/updates a risk of collision with the vehicle ob during the first stage of braking. When it is determined that a collision is inevitable or the updated risk is still greater than a predetermined reference, the controller deactivate at least one break (or reduce braking force) or reduce braking force of the deactivate at least one break such that the vehicle makes a turn to secure a space for escaping via the door 100 (second stage of braking). In embodiments, subsequent to the first stage of braking, the controller controls a brake of the door side wheel 2b (the closest to the door 1) to reduce its braking force than the first stage of braking such that the vehicle makes a turn (left turn to make the door face the vehicle ob, see in FIGS. 3D and 3E). In other embodiments, in the second stage of braking, the controller reduces braking power of brake 2a (located on an opposite side of the door 100) such that vehicle makes a right turn to have the door 100 face away from the vehicle ob. FIG. 1 shows the exterior of a vehicle, according to an embodiment of the present disclosure, and FIG. 2 is a control block diagram of a vehicle, according to an embodiment of the present disclosure.

Referring to FIG. 1, a vehicle 100 may be any kind of vehicle, such as an automobile, a passenger vehicle such as the bus, a truck, etc., but for convenience for explanation, a bus will be taken as an example of the vehicle 100.

A door 1 is opened or closed for the passenger to get on or get off the vehicle 100. The door 1 may be provided on one side of the vehicle 100. Although there may be a plurality of doors on the side, it is assumed that a single door 1 is provided on the front right side of the vehicle 100 as shown in FIG. 1, for convenience of explanation. The door 1 may be opened or closed under the control of a controller 120, which will be described later.

Car wheels 2a-2d move the car body forming the exterior of the vehicle 100 and chassis that supports constituent parts of the vehicle 100.

The car wheels 2a-2d may include front wheels 2a, 2b provided on a front portion of the vehicle and rear wheels 2c, 2d provided on a rear portion of the vehicle, and the vehicle 100 may be moved forward or backward by rotation of the car wheels 2a-2d. Although FIG. 1 shows that there are four car wheels 2a-2d, the number of car wheels 2a-2d is not limited thereto.

Windshield glasses 3a, 3b allow the person in the vehicle 100 to obtain visual information from the side, front, or behind of the vehicle 100. The windshield glasses may include a front glass 3a and side glasses 3b, and further include a rear glass.

A camera 4 and a radar 5 perform a function as an obstacle detector 110 (see FIG. 2) to detect an obstacle around the vehicle 100.

The camera 4 may acquire images of an obstacle or a road condition in the forward direction, backward direction, or lateral direction of the vehicle 100, and provide the image data to the controller 120 (see FIG. 2).

For example, the vehicle 100 may use the image data to recognize a wall existing on the left or right hand side of the vehicle 100 or recognize another vehicle located in front. Although FIG. 1 shows that the camera 4 is located at an upper end of the front glass 3a of the vehicle 100, the position is not limited thereto.

The radar 5 refers to an obstacle detector that detects a distance, direction, altitude, speed, etc., of an object by irradiating electronic waves (e.g., radio waves, micro waves, etc.) to the object and receiving the electronic waves reflected from the object. The radar 5 may include a radar antenna for transmitting electronic waves or receiving electronic waves reflected from an object. The data detected by the radar 5 is provided to the controller 120. Although FIG. 1 shows that the radar 4 is located on a bumper hood of the vehicle 100, the position where the radar 5 is installed is not limited thereto.

In addition to what are described above, the vehicle 100 may include a power system for turning the wheels 2a-2d, a steering system for changing a moving direction of the vehicle 100, and a braking system for stopping the movement of the car wheels 2a-2d.

The power system provides turning force to the front wheels 2a, 2b or rear wheels 2c, 2d to move the vehicle 100 forward or backward. The power system may include an engine that burns a fuel to create the turning force or a motor that produces the turning force by receiving electrical power from a charging battery.

The steering system may include a steering handle manipulated by the driver for controlling a driving direction, a steering gear for transforming the rotary motion of the steering handle to the reciprocating motion, and a steering link for transferring the reciprocating motion of the steering gear to the front wheels 2a, 2b. The steering system may change the moving direction of the vehicle 100 by changing the direction of the rotation axis of the front wheels 2a, 2b.

The braking system may include a brake pedal manipulated by the driver for braking operation, brake drums coupled with the front wheels 2a, 2b or the rear wheels 2c, 2d, and a brake shoe for braking the rotation of the brake drum using frictional force. The braking system may brake driving of the vehicle 100 by stopping the rotation of the front wheels 2a, 2b or the rear wheels 2c, 2d.

Referring to FIG. 2, the vehicle 100 includes the obstacle detector 110 and the controller 120.

The obstacle detector 110 detects an obstacle around the vehicle 100 and sends the detected data to the controller 120. The detected data may be information relating to the obstacle, such as a longitudinal position, a lateral position, relative speed, relative acceleration, etc., of the obstacle.

The obstacle detector 110 may include the camera 4 and the radar 5 as described above in connection with FIG. 1, without being limited thereto. For example, the obstacle detector 110 may include various detectors to detect the position of an obstacle around the vehicle 100.

The controller 120 is a processor responsible for controlling general operation of the vehicle 100 and controls respective components of the vehicle 100.

The controller 120 may be integrated with a storage medium that may store data, in a System on Chip (SoC) embedded in the vehicle 100. In this regard, there may be not only one but multiple SoCs embedded in the vehicle 100, and the aforementioned components may not be limited to being integrated in a single SoC.

The controller 120 may include a safety controller 121 and a braking controller 122, which may be implemented in separate modules or in a single module.

The safety controller 121 may analyze an obstacle in front of the vehicle 100 to predict a chance of the obstacle coming into collision with the vehicle 100, and if a collision between the obstacle and the vehicle 100 is predicted, may predict a chance of collision on the side of the door 1 of the vehicle 100. If the collision on the side of the door 1 is predicted, the braking controller 122 sends a partial braking signal for the braking controller 122 to perform partial braking.

FIG. 3A to 3E are for explaining a detailed operation procedure of the safety controller and the braking controller of the vehicle in a case that there is a collision between the vehicle and an obstacle.

Specifically, the safety controller 121 calculates time to collision (TTC) between the vehicle 100 and an obstacle ob or a required braking distance of the vehicle 100 to the obstacle ob based on the detected data received from the obstacle detector 110.

The safety controller 121 may calculate the required braking distance in the following equation 1:

$$D_{required} = \frac{V_{current}^2}{2a_{fullbrake}} \quad (1)$$

where $D_{required}$ may denote a required braking distance, $V_{current}$ may denote a current relative speed between the vehicle 100 and the obstacle ob, and $a_{full\ brake}$ may denote a relative accelerated velocity in full braking≈decelerated velocity in full braking+relative accelerated velocity.

The safety controller 121 determines whether the vehicle 100 may avoid the obstacle ob, i.e., whether a collision between the vehicle 100 and the obstacle ob is likely happen, based on the calculated TCC or the required braking distance and the current speed of the vehicle 100

Figure 3B:
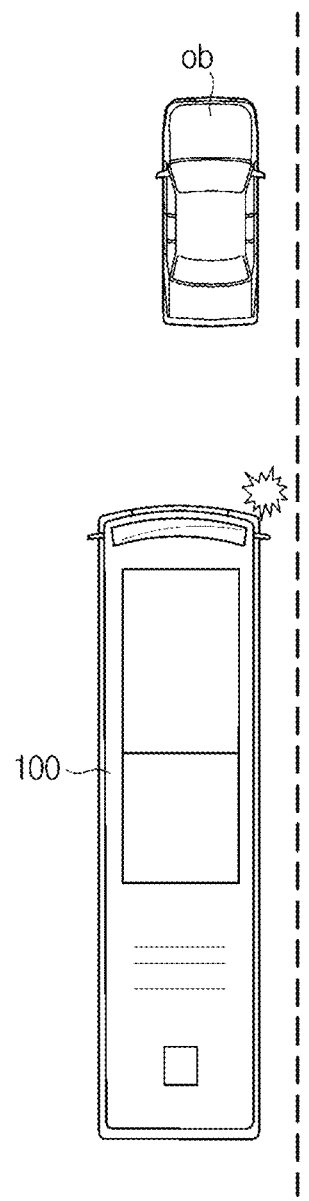

If a collision between the vehicle 100 and the obstacle ob is predicted, the safety controller 121 predicts a chance of a collision on the side of the door 1 of the vehicle 100 based on information about the lateral position and width of the obstacle ob (see FIG. 3B). How to predict the chance of a collision on the side of the door 1 based on the information about the lateral position and width of the obstacle ob will be described in detail later.

Figure 3C:
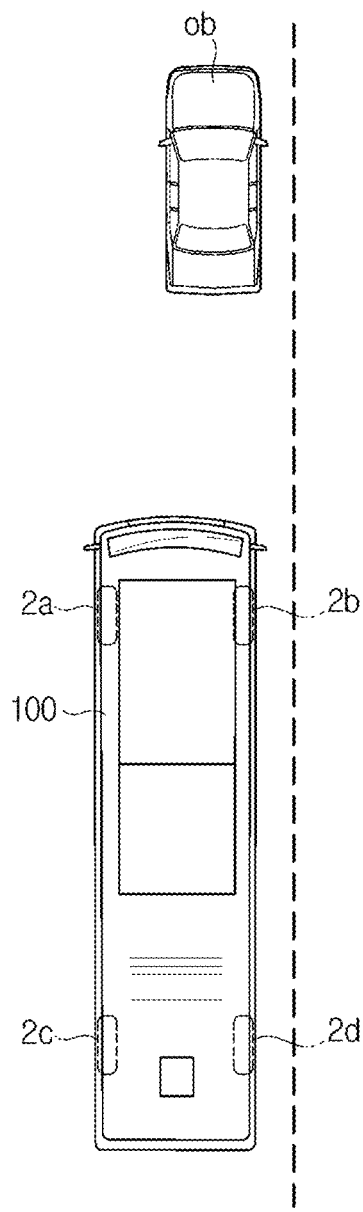

If the collision on the side of the door 1 is predicted, the safety controller 121 sends a partial braking control signal for the braking controller 122 to perform partial braking (see FIG. 3C).

Figure 3D:
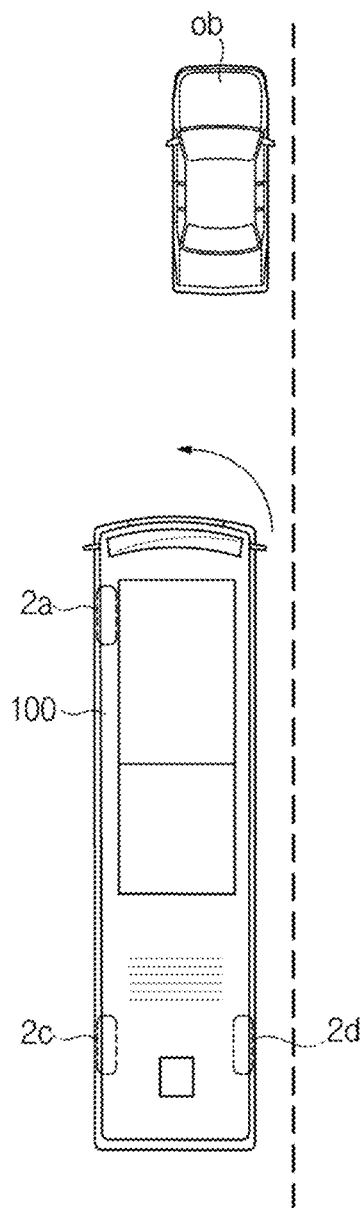
Figure 3E:
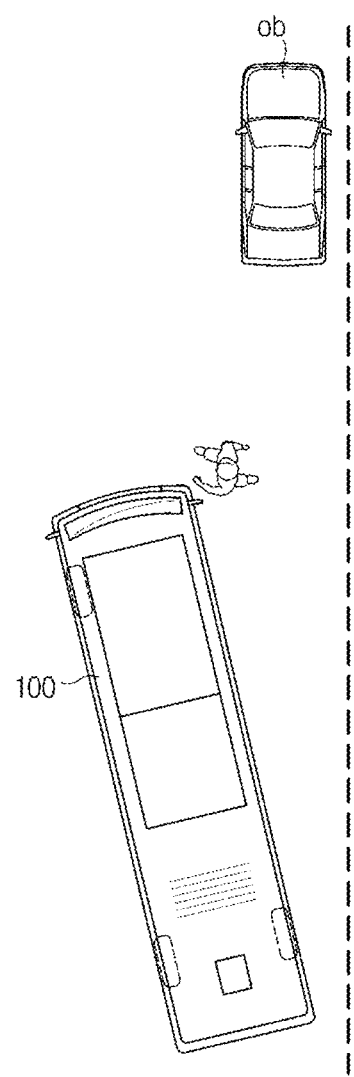

Upon reception of the partial braking control signal from the safety controller 121, the braking controller 122 performs partial braking to secure get-on/get-off space for passengers (see FIGS. 3D and 3E).

For example, in a case that the brake drum is provided for the front wheels 2a, 2b of the vehicle 100 and the door 1 is located on the right side of the vehicle 100, the braking controller 122 may control the braking system to brake not the front wheel 2b on the side of the door 1 but the other front wheel 2a (see FIGS. 1 and 3) among the front wheels 2a, 2b that may be stopped by the braking system, and accordingly, the vehicle 100 may turn to the left in FIG. 3.

In another example, in a case that the brake drum is provided for the rear wheels 2c, 2d of the vehicle 100 and the door 1 is located on the right side of the vehicle 100, the braking controller 122 may control the braking system to brake not the rear wheel 2d on the side of the door 1 but the other rear wheel 2c (see FIG. 1) among the rear wheels 2c, 2d that may be stopped by the braking system, and accordingly, the vehicle 100 may turn to the left.

In yet another example, in a case that the brake drums are provided for both the front wheels 2a, 2b and the rear wheels 2c, 2d of the vehicle 100 and the door 1 is located on the right side of the vehicle 100, the braking controller 122 may control the braking system to brake not the front wheel 2b and rear wheel 2d on the side of the door 1 but the other front wheel 2a and the other rear wheel 2c (see FIG. 1) among the front and rear wheels 2a-2d, and accordingly, the vehicle 100 may turn to the left.

In addition, in other various ways, the braking controller 122 may perform partial braking on the vehicle 100 in the opposite direction of the side of the door 1.

In the meantime, the safety controller 121 may send a normal braking control signal for the braking controller 122 to perform normal braking control if collision between the vehicle 100 and the obstacle ob is not predicted. Upon reception of the normal braking signal, the braking controller 122 may control the braking system to brake rotation of all the brake drums equipped in the vehicle 100.

The obstacle detector 110 and the controller 120 may exchange data using a controller area network (CAN) communication scheme.

At least one component may be added or deleted to correspond to the performance of the components of the vehicle 100 shown in FIGS. 1 and 2. Furthermore, it will be obvious to the ordinary skilled people in the art that the relative positions of the components may be changed to correspond to the system performance or structure.

Some components of the vehicle 100 may be implemented in software, or hardware such as Field Programmable Gate Arrays (FPGAs) and Application Specific Integrated Circuits (ASICs).

Figure 4:
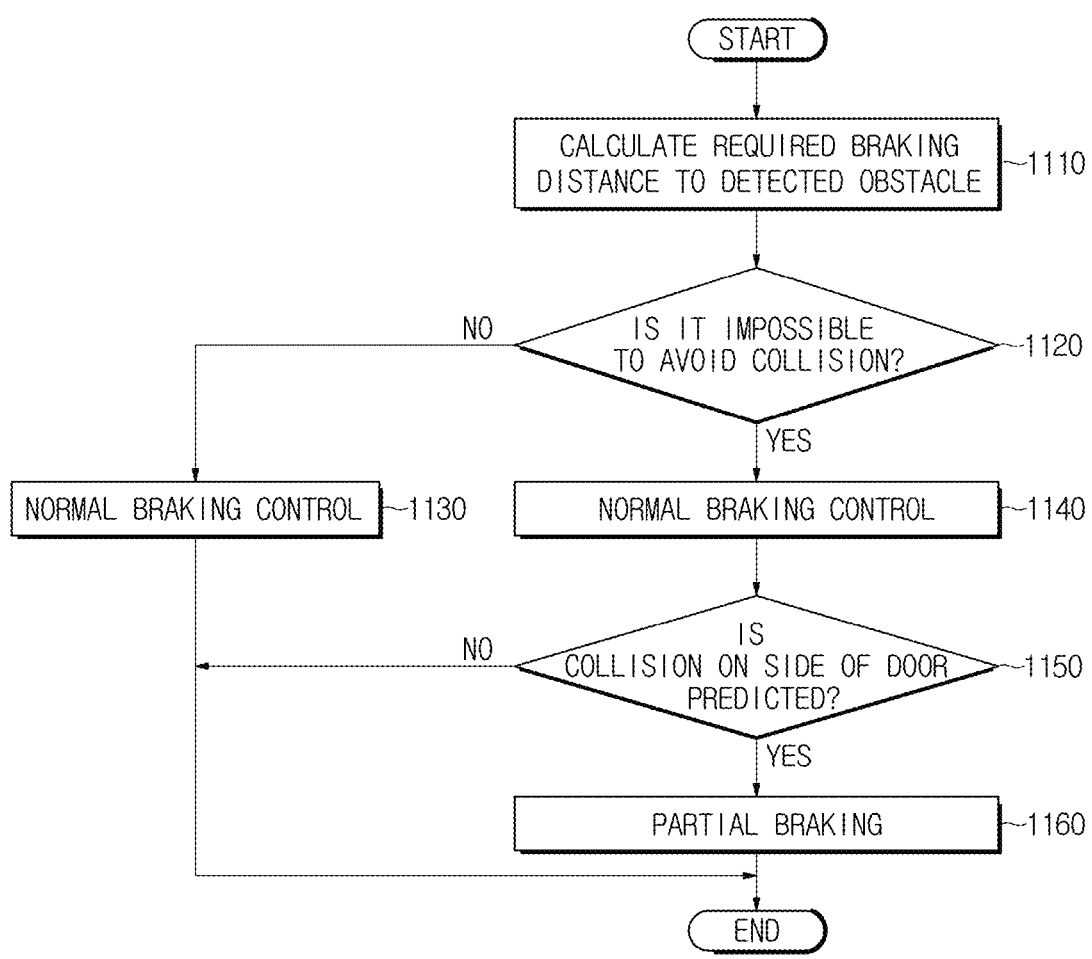
FIG. 4 is a flowchart of operation of a control method of a vehicle, according to an embodiment of the present disclosure.

A control method of a vehicle in accordance with an embodiment of the present disclosure will now be described in connection with FIG. 4. FIG. 4 is a flowchart of operation of a control method of a vehicle, according to an embodiment of the present disclosure.

First, the vehicle detects an obstacle and calculates a braking distance required for the detected obstacle, in 1110. Specifically, the vehicle obtains detected data for the obstacle through the obstacle detector, calculates TCC between the vehicle and the obstacle, and calculates a required braking distance of the vehicle to the obstacle based on the TCC.

Next, the vehicle predicts a chance of collision between the vehicle and the obstacle based on the required braking distance calculated by the safety controller and the current speed of the vehicle, in 1120.

If the collision between the vehicle and the obstacle is not predicted, i.e., if it is possible to avoid the collision in 1120, the vehicle then performs normal braking control through the controller, in 1130.

On the other hand, if the collision between the vehicle and the obstacle is predicted, normal braking control is performed first to reduce impulse of the collision with the obstacle, in 1140, and a chance of a collision on the side of the door 1 of the vehicle is predicted based on information about a lateral position and width of the obstacle, in 1150.

Figure 5:
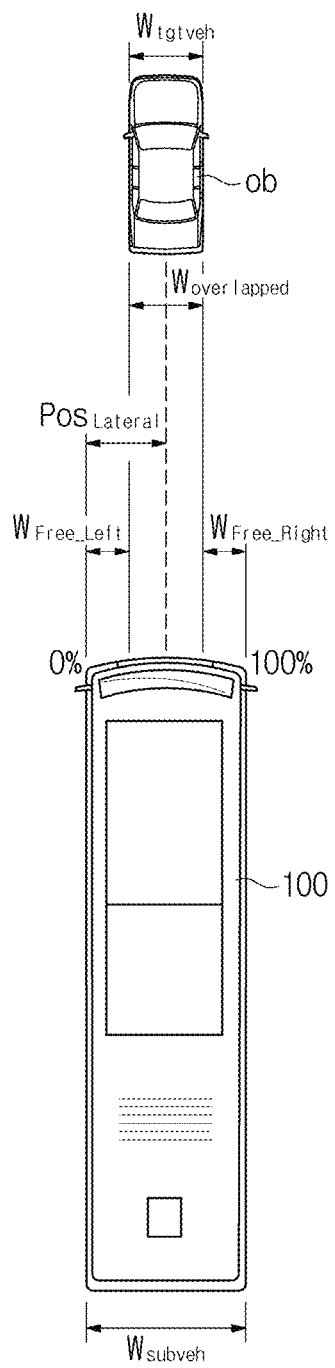
FIGS. 5, 6A and 6B are views for explaining how a vehicle predicts a chance of a collision on the side of a door.

FIGS. 5 and 6 are views for explaining how a vehicle predicts a chance of a collision on the side of a door. In connection with FIGS. 5 and 6, it is assumed that the door is provided on the left side of the vehicle 100.

The safety controller of the vehicle 100 may predict a chance of a collision on the side of the door based on at least one of an overlapped ratio in the width direction between the vehicle and the obstacle ob, non-overlapped ratios in the width direction between the vehicle 100 and the obstacle ob on the left and right sides, or a lateral position where the center of the width direction of the obstacle comes into contact with the vehicle in the width direction.

Referring to FIG. 5, the overlapped ratio (Overlap (%)) in the width direction between a subject vehicle (subveh) and an obstacle, which is a target vehicle (tgtveh) may be expressed as in equation 2; the non-overlapped ratio (Free_Right (%)) in the width direction between the vehicle 100 and the obstacle ob on the right side may be expressed as in equation 3; the non-overlapped ratio (Free_Left (%)) in the width direction between the vehicle 100 and the obstacle ob on the left side may be expressed as in equation 4; the lateral position (Lateral_Position (%)) where the center of the width of the obstacle ob comes into contact with the vehicle in the width direction may be expressed as in equation 5.

$$\text{Overlap}(\%) = W_{overlap}/W_{subveh} * 100 \qquad (2)$$

$$\text{Free\_Right}(\%) = W_{Free\_Right}/W_{subveh} * 100 \qquad (3)$$

$$\text{Free\_Left}(\%) = W_{Free\_Left}/W_{subveh} * 100 \qquad (4)$$

$$\text{Lateral\_Position}(\%) = Pos_{Lateral}/W_{subveh} * 100 \qquad (5)$$

If the width of the obstacle ob is equal to or greater than a predetermined threshold, the safety controller of the vehicle 100 may determine that the overlapped ratio between the vehicle 100 and the obstacle ob in the width direction exceeds a first threshold percent (%), and that a collision on the side of the door is likely to happen if the non-overlapped ratio with the obstacle ob on the side of the door with respect to the width direction of the vehicle 100 is about 0%. At this time, as for a reference to determine a collision on the side of the door to a wide obstacle ob whose thickness is equal to or wider than a threshold of 0.5 m, the first threshold percent may be about 15% and the non-overlapped ratio on the side of the door may be about 0%, without being limited thereto. For example, the wide object may be another vehicle.

Figure 6A:
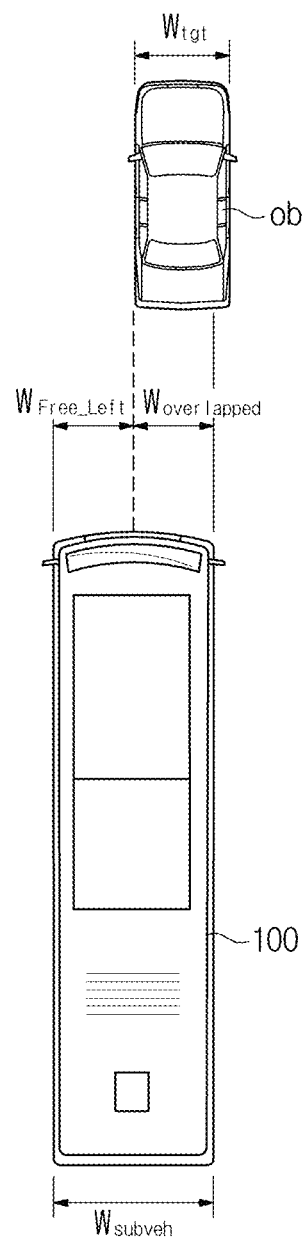

Referring to FIG. 6A, if the width $W_{tgt}$ of the obstacle ob is equal to or greater than about 0.5 m, Overlap is about 50%, W Free Right is about 0%, and $W_{Free\_Left}$ is about 50%, the safety controller of the vehicle 100 may determine that a collision on the side of the door is likely to happen because the reference where Overlap>15% and $W_{Free\_Right}$=0% is satisfied.

If the width of the obstacle ob is less than the threshold, the safety controller of the vehicle 100 may determine that the overlapped ratio between the vehicle 100 and the obstacle ob in the width direction exceeds a second threshold percent (%), and that a collision on the side of the door is likely to happen if the center of the width of the obstacle ob contacts a point of the vehicle 100 that exceeds 60% of the width of the vehicle 100. At this time, as for a reference to determine a collision on the side of the door to a narrow obstacle ob whose thickness is less than the threshold of 0.5 m, the second threshold percent may be about 1% and the center of the width of the obstacle may exceed a point that exceeds 60% of the width of the vehicle 100, without being limited thereto. For example, the narrow obstacle may be a utility pole, a roadside tree, etc.

Figure 6B:
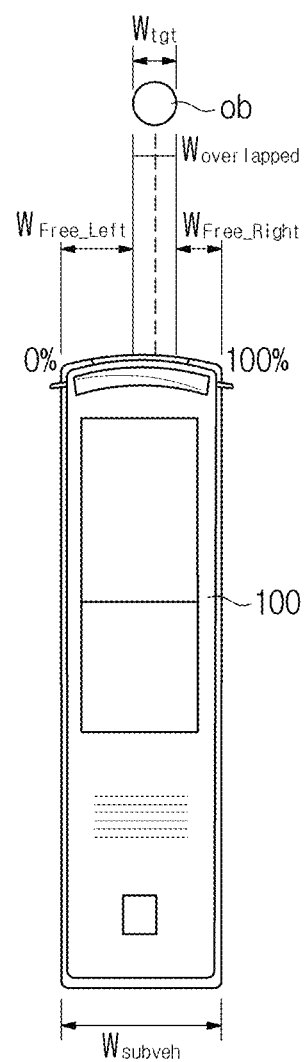

Referring to FIG. 6B, if the width $W_{tgt}$ of the obstacle ob is less than about 0.5 m, Overlap is about 25%, $W_{Free\_Right}$ is about 25%, and $W_{Free\_Left}$ is about 55%, the safety controller of the vehicle 100 may determine that a collision on the side of the door is likely to happen because the reference where Overlap>1%, Pos_Lat>60% is satisfied.

Turning back to FIG. 4, when the collision on the side of the door is predicted, in 1150, the braking controller of the vehicle performs partial braking control, in 1160. How to perform the partial braking control was described above in connection with FIG. 3, so the overlapping description thereof will be omitted.

A vehicle and control method thereof in accordance with embodiments of the present disclosure may make it easy for passengers to get out of the vehicle during a car accident by securing space for escape by a door before the accident.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Certain embodiments of the present invention have been described above. In the embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described embodiments, embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A vehicle comprising:
an obstacle detector for detecting an obstacle around the vehicle; and
a controller configured to:
determine whether the obstacle is detected on a side of a door of the vehicle,
when the obstacle is detected on the side of the door and in front of the vehicle, predict a chance of a collision with the detected obstacle, and
when the collision with the detected obstacle on the side of the door is predicted, apply a braking force on a brake on the side of the door, among a plurality of brakes of the vehicle, different from a braking force applied on remaining brakes of the plurality of brakes such that a partial braking control on the vehicle is performed and the vehicle makes a turn to secure a space between the door and the detected obstacle when the vehicle stops.

2. The vehicle of claim 1, wherein the controller is configured to calculate a required braking distance or time to collision (TCC) to the obstacle based on the detection result of the obstacle detector and to predict a chance of a collision on the side of the door based on the calculation result.

3. The vehicle of claim 1, further comprising: a braking system for stopping movement of at least one of a plurality of car wheels by at least one brake of the plurality of brakes,
wherein the controller is configured to control the braking system to apply the different braking force on the brake on the side of the door, among the plurality of brakes of the vehicle to brake one car wheel on the side of the door, among the plurality of car wheels, when the collision with the detected object on the side of the door is predicted.

4. The vehicle of claim 3, wherein the braking system brakes at least one of two front wheels among the plurality of car wheels, and
wherein the controller is configured to control the braking system to brake one of the two front wheels other than a front wheel on the side of a door when the collision with the detected object on the side of the door is predicted.

5. The vehicle of claim 1, wherein the controller is configured to predict the collision with the detected object on the side of the door based on information about a lateral position and width of the obstacle.

6. The vehicle of claim 1, wherein the controller is configured to predict the chance of the collision with the detected object on the side of the door based on overlap information including at least one of an overlapped ratio between the vehicle and the detected obstacle in a width direction, non-overlapped ratios between the vehicle and the detected obstacle in the width direction on left and right sides, and a lateral position where a center of a width of the detected obstacle contacts the vehicle in the width direction.

7. The vehicle of claim 1, wherein the controller is configured to determine that there is a collision on the side of a door when an overlapped ratio between the vehicle and the detected obstacle in a width direction exceeds a first threshold percent (%) and a non-overlapped ratio between the vehicle and the detected obstacle on the side of the door in the width direction is about 0% in a case that a width of the detected obstacle is equal to or greater than a threshold.

8. The vehicle of claim 1, wherein the controller is configured to determine that there is a collision on the side of the door when an overlapped ratio between the vehicle and the detected obstacle in a width direction exceeds a second threshold percent (%) and a center of a width of the detected obstacle contacts a point that exceeds about 60% of a width of the vehicle in a case that the width of the detected obstacle is less than a threshold.

9. The vehicle of claim 1, wherein the controller is configured to calculate a required braking distance in the following equation:

$$D_{required} = \frac{V_{current}^2}{2a_{fullbrake}},$$

where $D_{required}$ denotes a required braking distance, $V_{current}$ denotes a current relative speed between the vehicle and the obstacle, and $a_{full\ brake}$ denotes a relative accelerated velocity in full braking≈decelerated velocity in full braking+relative accelerated velocity.

10. The vehicle of claim 1, further comprising: a braking system for stopping movement of a plurality of car wheels,
wherein the controller is configured to:
calculate a required braking distance or time to collision (TCC) to the detected obstacle based on the detection result of the obstacle detector,
predict a chance of a collision with the detected obstacle based on the calculation result, and
control the braking system to stop movement of the plurality of car wheels using the plurality of brakes when it is determined that it is possible to avoid the collision with the detected obstacle.

11. The vehicle of claim 1, further comprising: a braking system for stopping movement of a plurality of car wheels,
wherein the controller is configured to calculate a required braking distance or time to collision (TCC) to the detected obstacle based on the detection result of the obstacle detector, to predict a chance of a collision with the detected obstacle based on the calculation result, to control the braking system to stop movement of the plurality of car wheels using the plurality of brakes when it is determined that it is impossible to avoid a collision with the detected obstacle, to predict the chance of a collision with the obstacle on the side of the door, and to control the partial braking over the vehicle when the collision on the side of the door is predicted.

12. A control method of a vehicle, the method comprising:
detecting, by an obstacle detector, an obstacle around the vehicle;
determining, by a controller, whether the obstacle is detected on a side of a door of the vehicle;
when the obstacle is detected on the side of the door and in front of the vehicle, predicting, by the controller, a chance of a collision with the obstacle on the side of the door; and
when the collision with the detected obstacle on the side of the door is predicted, performing, by the controller, a partial braking control on the vehicle,
wherein performing the partial braking control comprises:
applying a braking force on a brake on the side of the door, among a plurality of brakes of the vehicle, different from a braking force applied on remaining brakes of the plurality of brakes such that the vehicle makes a turn to secure a space between the door and the detected obstacle when the vehicle stops.

13. The method of claim 12, wherein the predicting of a chance of a collision with the obstacle on the side of the door comprises calculating a required braking distance or time to collision (TCC) to the obstacle based on the detection result and predicting a chance of a collision on the side of the door based on the calculation result.

14. The method of claim 12, wherein the performing of partial braking control on the vehicle comprises controlling a braking system to brake one of two front wheels other than the other front wheel on the side of a door when the collision on the side of the door is predicted.

15. The method of claim 12, wherein the predicting of the chance of a collision with the obstacle on the side of the door comprises predicting a chance of a collision on the side of the door based on information about a lateral position and width of the obstacle.

16. The method of claim 12, wherein the predicting of the chance of a collision with the obstacle on the side of the door comprises predicting a chance of a collision on the side of the door based on overlap information including at least one of an overlapped ratio between the vehicle and the obstacle in a width direction, non-overlapped ratios between the vehicle and the obstacle in the width direction on left and right sides, and a lateral position where a center of a width of the obstacle contacts the vehicle in the width direction.

17. The method of claim 12, wherein the predicting of the chance of a collision with the obstacle on the side of the door comprises determining that there is a collision on the side of a door when an overlapped ratio between the vehicle and the obstacle in a width direction exceeds a first threshold percent (%) and a non-overlapped ratio between the vehicle and the obstacle on the side of the door in the width direction is about 0% in a case that a width of the obstacle is equal to or greater than a threshold.

18. The method of claim 12, wherein the predicting of the chance of a collision with the obstacle on the side of the door comprises determining that there is a collision on the side of a door when an overlapped ratio between the vehicle and the obstacle in a width direction exceeds a second threshold percent (%) and a center of a width of the obstacle contacts a point that exceeds about 60% of the width of the vehicle in a case that the width of the obstacle is less than a threshold.

* * * * *